US012257637B2

(12) United States Patent
Frota de Souza Filho

(10) Patent No.: US 12,257,637 B2
(45) Date of Patent: Mar. 25, 2025

(54) ROTARY CUTTING TOOL WITH TUNABLE VIBRATION ABSORBER

(71) Applicant: Kennametal Inc., Latrobe, PA (US)

(72) Inventor: Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 390 days.

(21) Appl. No.: 17/706,265

(22) Filed: Mar. 28, 2022

(65) Prior Publication Data

US 2023/0302553 A1   Sep. 28, 2023

(51) Int. Cl.
   *B23C 5/28*   (2006.01)
   *B23C 5/00*   (2006.01)

(52) U.S. Cl.
   CPC .............. *B23C 5/003* (2013.01); *B23C 5/28* (2013.01)

(58) Field of Classification Search
   CPC . B23C 5/003; B23C 2250/16; B23C 2250/12; B23B 2250/16; B23B 2251/70; B23B 29/022
   See application file for complete search history.

(56) References Cited

U.S. PATENT DOCUMENTS

| | | | |
|---|---|---|---|
| 6,116,825 A * | 9/2000 | Kammermeier | B23B 51/06 408/1 R |
| 8,337,125 B2 * | 12/2012 | Digernes | B23B 29/022 279/20 |
| 8,371,776 B2 * | 2/2013 | Lin | B23B 27/007 82/158 |
| 8,702,352 B2 * | 4/2014 | Sjoo | B23C 5/003 407/67 |
| 8,820,496 B2 * | 9/2014 | Digernes | F16F 7/1034 409/141 |
| 9,586,266 B2 * | 3/2017 | Eichelberger | B23B 27/002 |
| 9,855,611 B2 * | 1/2018 | Eichelberger | B23B 29/022 |

(Continued)

FOREIGN PATENT DOCUMENTS

| | | |
|---|---|---|
| CH | 701414 A1 | 1/2011 |
| CN | 203409277 U | 1/2014 |

(Continued)

OTHER PUBLICATIONS

Jul. 22, 2024 Foreign Office Action German Application No. DE202310202140, 14 pages.

*Primary Examiner* — Ryan Rufo
(74) *Attorney, Agent, or Firm* — Christopher J. Owens

(57) ABSTRACT

A rotary cutting tool includes a tool body including a shank portion and a cutting portion adjoining the shank portion. The cutting portion has a plurality of blades separated by helically twisted flutes. A tunable vibration absorber is disposed within an internal cavity formed in the cutting portion and has a shape that follows the helically twisted flutes. The tunable vibration absorber includes an absorber mass and a resilient material disposed between the absorber mass and an outer wall of the internal cavity. In one aspect, the tunable vibration absorber is tuned to a desired frequency by selecting the mechanical properties of the absorber mass and the resilient material. In another aspect, the tunable vibration absorber is tuned by controlling a pressure of fluid within a main internal fluid cavity disposed within the tunable vibration absorber.

15 Claims, 6 Drawing Sheets

(56) References Cited

U.S. PATENT DOCUMENTS

| | | |
|---|---|---|
| 9,889,506 B2 | 2/2018 | Nakatani et al. |
| 9,975,182 B2 | 5/2018 | Stoyanov |
| 10,040,127 B2 * | 8/2018 | Frota de Souza Filho ................ B23B 27/007 |
| 10,695,838 B2 | 6/2020 | Lehto et al. |
| 10,717,134 B2 | 7/2020 | Matsuda et al. |
| 10,857,599 B2 | 12/2020 | Marchione et al. |
| 2010/0096228 A1 * | 4/2010 | Digernes ................ B23C 5/003 188/269 |
| 2010/0242696 A1 * | 9/2010 | Digernes ................ B23B 27/10 83/169 |
| 2011/0229278 A1 * | 9/2011 | Sjoo .......................... B23C 5/10 407/40 |
| 2014/0105701 A1 * | 4/2014 | Matano ................... B23C 5/003 409/141 |
| 2016/0214182 A1 * | 7/2016 | Eichelberger ........... F16F 7/015 |
| 2016/0332236 A1 | 11/2016 | Stoyanov |
| 2017/0056977 A1 * | 3/2017 | Eichelberger ......... F16F 7/1034 |
| 2017/0197251 A1 | 7/2017 | Nakatani et al. |
| 2018/0361485 A1 | 12/2018 | Matsuda et al. |
| 2019/0084047 A1 | 3/2019 | Lehto et al. |
| 2020/0222990 A1 | 7/2020 | Marchione et al. |
| 2021/0016359 A1 * | 1/2021 | Shidrameshetra .... B23B 29/043 |
| 2021/0039172 A1 * | 2/2021 | Fu ..................... B23Q 11/0035 |

FOREIGN PATENT DOCUMENTS

| | | |
|---|---|---|
| DE | 10239670 A1 | 3/2004 |
| DE | 102015107440 A1 | 11/2015 |
| DE | 102020122413 A1 | 3/2021 |
| JP | 59129602 A2 | 7/1984 |
| JP | 2003062735 A * | 3/2003 |
| JP | 2006102837 A | 4/2006 |
| JP | 2019123041 A2 | 7/2019 |
| KR | 101846154 B1 * | 4/2018 |
| WO | 2012/084688 A1 | 6/2012 |
| WO | WO-2023074924 A1 * | 5/2023 |

* cited by examiner

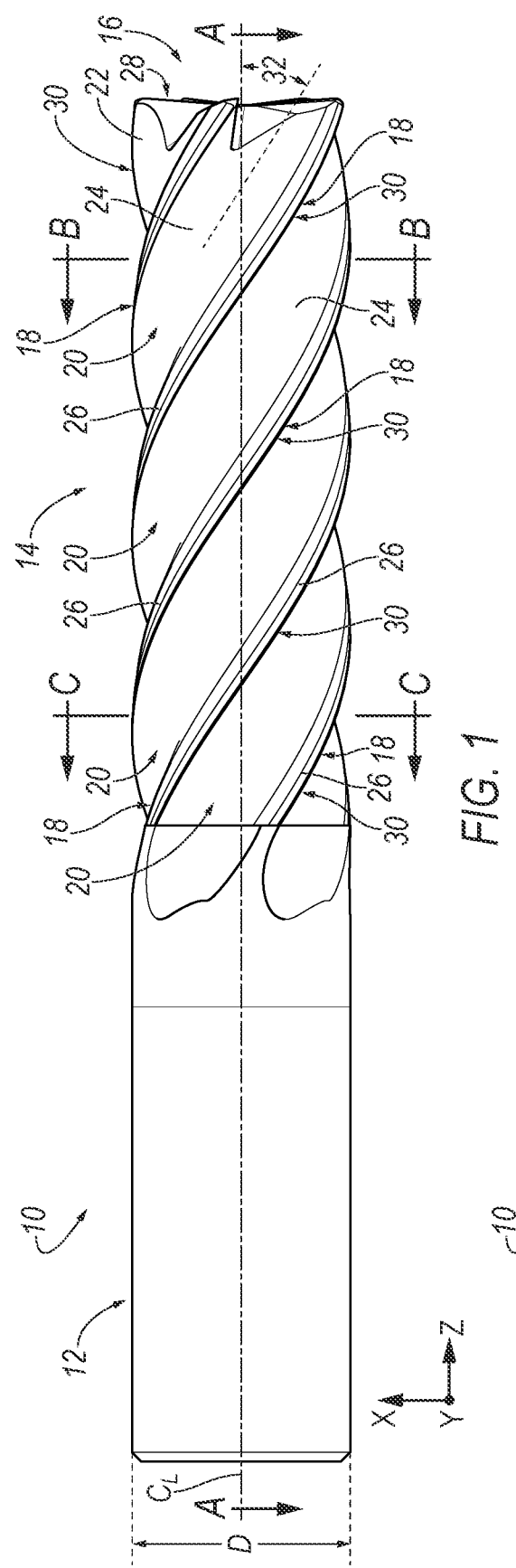
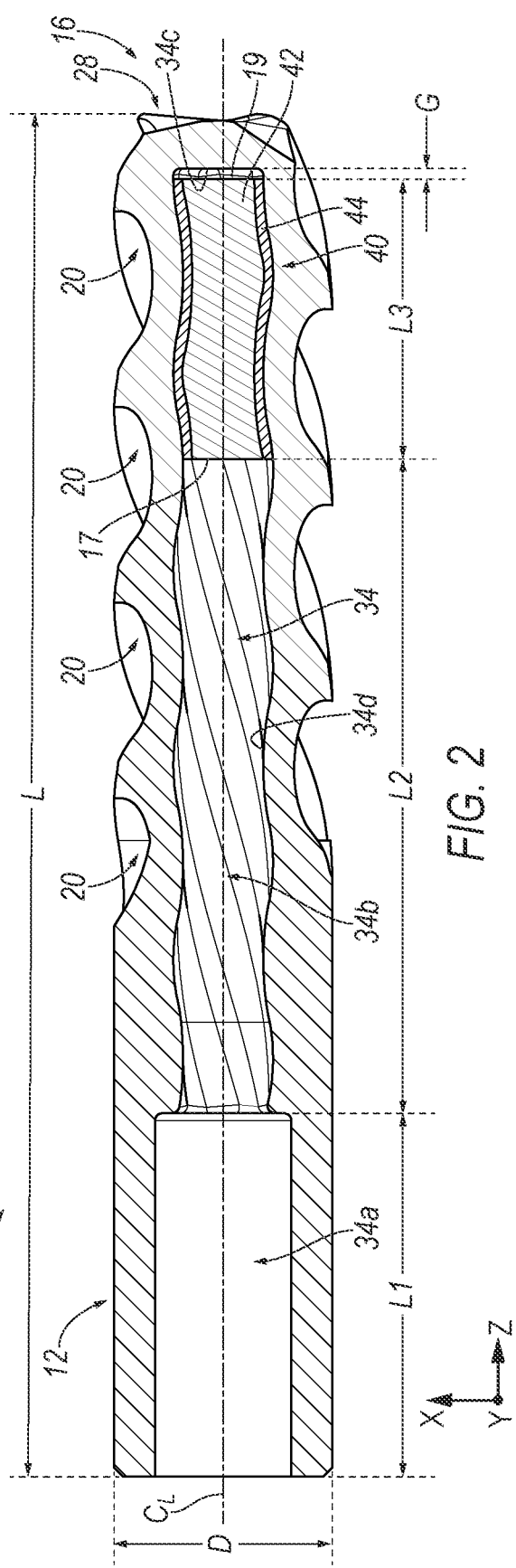
FIG. 1
FIG. 2

ROTARY CUTTING TOOL WITH TUNABLE VIBRATION ABSORBER

FIELD OF THE INVENTION

In general, the invention relates to a rotating cutting tool, and more particularly, to a rotary cutting tool, such as a solid carbide end mill (SCEM), and the like, with a tunable vibration absorber for suppressing or eliminating torsional vibrations during operation.

BACKGROUND OF THE INVENTION

Conventional solid end mills having cutting edges disposed on both end surfaces and peripheral surfaces are frequently used in operation where it is desired that the tool remove material in both the axial and radial directions, as in the case of slotting operations.

During a metal cutting operation, any vibratory motion between a cutting tool and workpiece may lead to undesirable cutting performances, such as poor workpiece surface finish and out-of-tolerance finished workpieces. Furthermore, such vibration may cause the cutting tool or the machine tool to become damaged.

Torsional vibration in drills with helical flutes can generate oscillations in the axial direction due to the helical shape of the flutes, which in turn can cause chip thickness variation, thereby leading to chatter. Typically, the self-excited vibrations caused by torsional (axial) vibration takes place at high frequencies and generates undesirable noise. This problem is particularly critical in large diameter modular drills and in rotating cutting tools with large length/diameter (i.e., L/D) ratios.

Thus, there is a need to suppress or eliminate vibrations in a rotating cutting tool.

SUMMARY OF THE INVENTION

The problem of suppressing vibrations in a rotary cutting tool is solved by providing a tunable vibration absorber having an absorber mass disposed within an internal cavity that follows the twisted helical shape of the flutes in the rotary cutting tool. The tunable vibration absorber also has a resilient material disposed between the absorber mass and the outer wall of the internal cavity. The length of the tunable vibration absorber and the mechanical properties of the tunable vibration absorber, such as stiffness, viscous damping, and the like, are selected in such a way that the frequency of the tunable vibration absorber is set close to the natural frequency of the drill body. In addition, the mechanical properties of the tunable vibration absorber are selected such that cause destructive interference between the frequency of the tunable vibration absorber and the natural frequency of the end mill, thereby reducing or eliminating vibration in the rotary cutting tool.

In one aspect, a rotary cutting tool comprises a shank portion and a cutting portion adjoining the shank portion, the cutting portion having a plurality of blades separated by helically twisted flutes. Each blade includes a leading face, a trailing face, and a land surface extending between the leading face and the trailing face. A tunable vibration absorber is disposed within an internal cavity formed in the cutting portion, the internal cavity having a shape that follows the helically twisted flutes. The tunable vibration absorber comprises an absorber mass and a resilient material disposed between the absorber mass and an outer wall of the internal cavity. The tunable vibration absorber is tuned to a desired frequency by selecting mechanical properties of the absorber mass and the resilient material, and the desired frequency of the tunable vibration absorber causes destructive interference between the tunable vibration absorber and the rotary cutting tool, thereby suppressing vibration of the rotary cutting tool during a cutting operation.

In another aspect, a rotary cutting tool comprises a shank portion and a cutting portion adjoining the shank portion and having a cutting end. The cutting portion has a plurality of blades separated by helically twisted flutes, each blade including a leading face, a trailing face, and a land surface extending between the leading face and the trailing face. A tunable vibration absorber is disposed within an internal cavity formed in the cutting portion and has a shape that follows the helically twisted flutes. The tunable vibration absorber comprises an absorber mass and a resilient material disposed between the absorber mass and an outer wall of the internal cavity. The tunable dynamic absorber includes a main internal fluid cavity extending in a longitudinal direction and substantially parallel with respect to a central, longitudinal axis, $C_L$, of the rotary cutting tool. The tunable vibration absorber is tuned by controlling a fluid pressure within the main internal fluid cavity.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 1 is a side view of a rotary cutting tool, such as a solid carbide end mill (SCEM), with an internal tunable vibration absorber according to an embodiment of the invention;

FIG. 2 is a cross-sectional view of the rotary cutting tool taken along line A-A of FIG. 1 showing the internal tunable vibration absorber disposed within a helically twisted internal cavity in the chip flute portion of the rotary cutting tool;

DETAILED DESCRIPTION OF THE INVENTION

Figure 3:
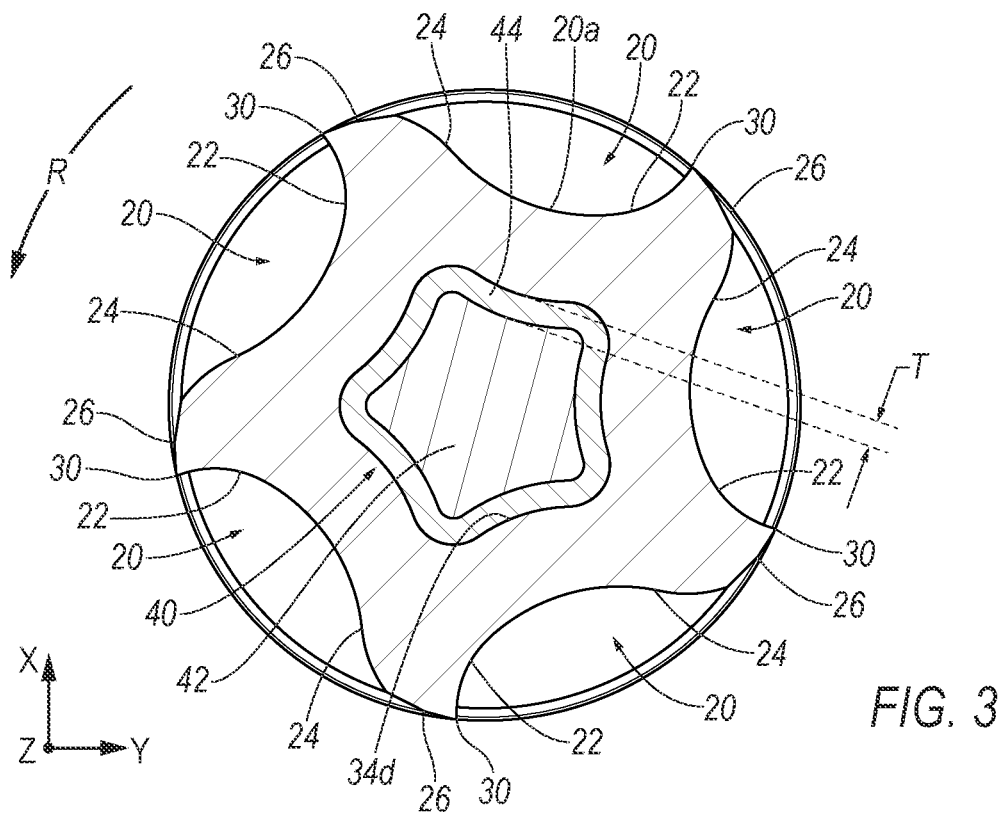
FIG. 3 is a cross-sectional view of the rotary cutting tool taken along line B-B of FIG. 1 showing the internal tunable vibration absorber disposed within the helically twisted internal cavity in the chip flute portion of the rotary cutting tool.

The description herein of specific applications should not be a limitation on the scope and extent of the use of the cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "helical" is defined as pertaining to or having the form of a helix or spiral. A "helix" or "spiral" is defined as a curve in three-dimensional space formed by a straight line drawn on a plane when that plane is wrapped around a cylindrical surface of any kind, especially a right circular cylinder, as the curve of a screw. A circular helix of radius a and slope b/a (or pitch 2πb) is described by the following parametrization:

$x(\theta) = a \sin \theta,$ $y(\theta) = a \cos \theta,$ $z(\theta) = b\theta.$ As used herein, the phrase "helix angle" is defined as the angle between any helix and an axial line on its right, circular cylinder or cone. The helix angle references the axis of the cylinder, distinguishing it from the lead angle, which references a line perpendicular to the axis. Thus, the helix angle is the geometric complement of the lead angle. The helix angle is measured in degrees.

As used herein, the helix of a flute can twist in two possible directions, which is known as handedness. Most flutes are oriented so that the cutting tool, when seen from a point of view on the axis through the center of the helix, moves away from the viewer when it is turned in a clockwise direction, and moves towards the viewer when it is turned counterclockwise. This is known as a right-handed (RH) flute geometry, because it follows the right-hand grip rule. Flutes oriented in the opposite direction are known as left-handed (LH).

As used herein, the term "3D printing" is any of various processes in which material is joined or solidified under computer control to create a three-dimensional object, with material being added together, such as liquid molecules or powder grains being fused together, typically layer by layer. In the 1990s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

As used herein, the term "torsional vibration" is angular vibration of an object, such as a shaft of a rotating cutting tool, along its axis of rotation.

As used herein, the term "axial vibration" is vibration of an object, such as a shaft of a rotating cutting tool, along its axis of rotation.

As used herein, the term "elongate" or "elongated" is defined as something that is longer than it is wide.

As used herein, the term "resilient" is defined as a substance or object that is able to recoil or spring back into shape after bending, stretching, or being compressed. Similar terms include, but is not limited to, flexible, pliable, pliant, supple, plastic, elastic, springy, rubbery, durable, hardwearing, stout, strong, sturdy, tough, and the like.

As used herein, the term "mechanical properties" includes, but is not limited to, brittleness, bulk modulus, coefficient of restitution, compressive strength, creep, ductility, durability, elasticity, fatigue limit, flexibility, flexural modulus, flexural strength, fracture toughness, friction coefficient, hardness, malleability, mass diffusivity, plasticity, Poisson's ratio, resilience, shear modulus, shear strength, slip, specific modulus, specific strength, specific weight, stiffness, surface roughness, tensile strength, toughness, viscosity, yield strength and Young's modulus.

Referring now to FIGS. 1-4, a rotary cutting tool 10 is shown according to an embodiment of the disclosure. In general, the rotary cutting tool 10, such as a solid carbide end mill (SCEM), is elongate and has a central, longitudinal axis, $C_L$, which can also be considered as the rotational axis. In other words, the width is smaller than its length. Although depicted as a solid carbide end mill (SCEM) in the exemplary embodiment described herein, it is to be appreciated that the principles of the invention described herein are applicable to other rotary cutting tools, such as, for example, without limitation, a solid carbide drill, a milling tool, a reamer, a tap, and the like.

The rotary cutting tool 10 comprises a shank portion 12 and a cutting portion 14 adjoining the shank portion 12. The cutting portion 14 defined by a plurality of blades 18 separated by flutes 20. The plurality of blades 18 of the cutting portion 14 define a cutting diameter, D. In the illustrated embodiment, the end mill 10 has a total of five (5) blades 18 and flutes 20. However, it will be appreciated that the invention is not limited by the number of blades and flutes, and that the invention can be practiced with a fewer or a greater number of blades and flutes. For example, the invention can be practiced with two blades and flutes, three blades and flutes, four blades and flutes, six blades and flutes, seven blades and flutes, eight blades and flutes, nine blades and flutes, ten blades and flutes, and the like. The end mill 10 has a cutting end 16 for engaging a workpiece (not shown) and rotates in a direction of the arrow, R (FIG. 3). Each blade 18 has a leading face 22, a trailing face 24, and a land surface 26 bridging the leading face 22 and trailing face 24. In addition, each blade 18 has an end face cutting edge 28 and a peripheral cutting edge 30 at the intersection between the leading face 22 and the land surface 26. It should be appreciated that the land surface 26 acts as a relief surface for the peripheral cutting edge 30.

The blades 18 and flutes 20 of the cutting portion 14 follow a twisted path along the cutting portion 14 at a helix angle 32 of between about 30 degrees and about 45 degrees with respect to the central, longitudinal axis, $C_L$. Thus, the blades 18 and flutes 20 can be considered to be "helically twisted". In the illustrated embodiment, the blades 18 and flutes 20 of the cutting portion 14 extend helically within the cutting portion 14 at a helix angle 32 of about 38 degrees. However, it will be appreciated that the invention is not limited by the magnitude of the helix angle 32, and that the invention can be practiced with any desirable helix angle 32 in a range between about greater than 0° and about 75°. It should be noted that the principles of the invention can be practiced in a rotary cutting tool having blades and flutes that are considered to be "straight flutes" extending substantially parallel to the central, longitudinal axis, A-A.

The end mill 10 has an internal cavity 34 for transporting a fluid that extends almost entirely a total length, L, of the end mill 10. In the illustrated embodiment, the internal cavity 34 can be generally divided into two sections: 1) a relatively larger diameter section 34a disposed within the shank portion 12 and having a length, L1; and 2) a relatively smaller diameter section 34b adjoining the relatively larger diameter section 34a and having a length equal to L2+L3+G, where L2 is the length of the internal cavity 34 without the tunable dynamic absorber 40, where L3 is the length of the tunable dynamic absorber 40, and G is the length of a gap 36 between the tunable dynamic absorber 40 and an end wall 34c of the internal cavity 34. In other words, the internal cavity 34 has a total length equal to L1+L2+L3+G.

In the illustrated embodiment, the end mill 10 has a cutting diameter, D, of about 12 mm (0.472 inches). In addition, the total length, L, of the end mill 10 is about 75 mm (2.95 inches), the length, L1, of the relatively larger diameter section 34a is about 20 mm (0.79 inches), the length, L2, of the relatively smaller diameter section 34b is about 36 mm (1.42 inches), the length, L3, is about 15.4 mm (0.606 inches), and the gap, G, is about 0.6 mm (0.024 inches).

Figure 4:
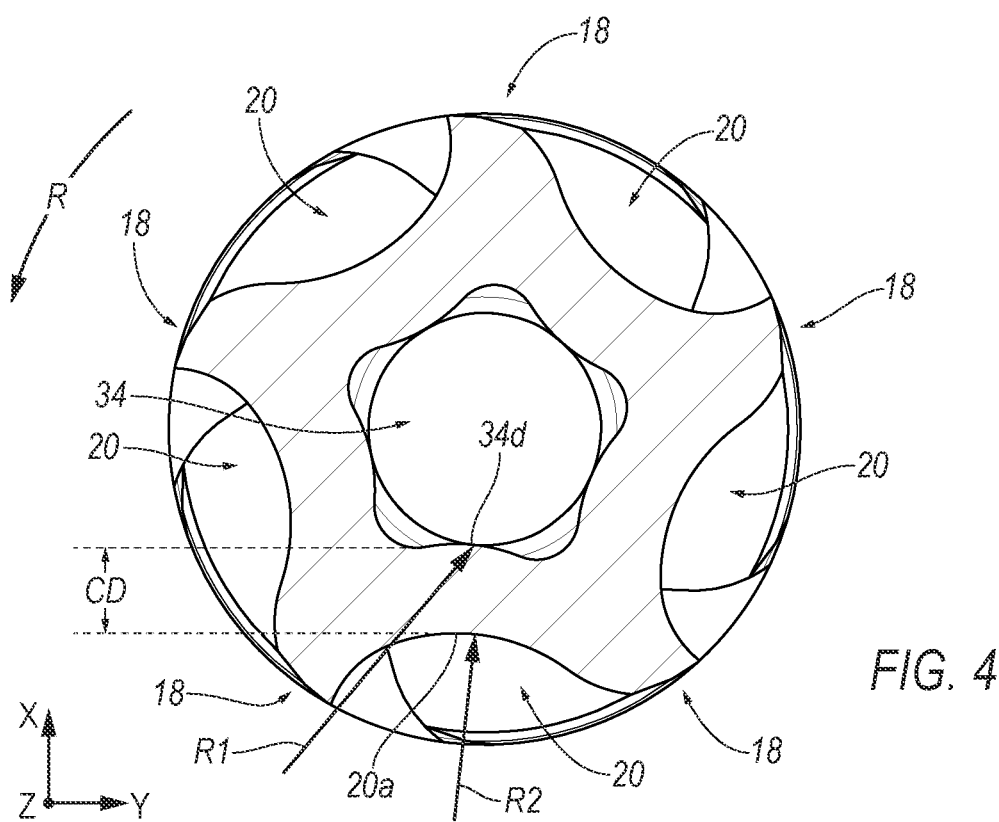
FIG. 4 is a cross-sectional view of the rotary cutting tool taken along line C-C of FIG. 1 showing the helically twisted internal cavity in the chip flute portion of the rotary cutting tool.

It is also noted that the relatively smaller diameter section 34b of the internal cavity 34 follows the twisted helical flutes 20 in the cutting portion 14 of the end mill 10. In other words, the internal cavity follows the twisted helical path in the cutting portion 14 of the end mill 10. This can be accomplished by forming the internal cavity 34 using an additive manufacturing (i.e., 3D printing) process. As a result, the internal cavity 34 maximizes the stiffness-to-weight ratio of the end mill 10. Further, the twisted helical three-dimensional shape of the internal cavity 34 provides a low modal mass and high dynamic stiffness. It is noted that the internal cavity 34 maintains a constant distance, CD, between a bottom 20a of each flute 20 and the side walls 34d of the internal cavity 34, as shown in FIG. 4. This is achieved by the internal cavity 34 following the same helically twisted path as a respective flute 20. It should be realized that the tunable vibration absorber 40 disposed within the internal cavity 34 also maintains the constant distance, CD, between the bottom 20a of each flute 20 and the side walls 34d of the internal cavity 34.

In the illustrated embodiment shown in FIGS. 3 and 4, the internal cavity 34 is substantially pentagon-shaped in cross-section because of the end mill 10 having a total of five flutes 20. Specifically, the internal cavity 34 has a total of five radiused side walls 34c having a radius of curvature, R1, that is approximately equal to the radius of curvature, R2, formed by the bottom 20a of the flute 20, as shown in FIG. 4. However, it will be appreciated that the principles of the disclosure can be practiced with any number of flutes 20 and corresponding number of radiused side walls 34c, for example, three, four, six, seven, eight, and the like.

As mentioned above, use of the end mill 10 in a metalworking operation will produce vibrations that travel through the end mill 10, thereby affecting the stability of the cutting process. For this reason, the cutting portion 14 of the end mill 10 includes a tunable vibration absorber, shown generally at 40, for suppressing torsional and axial vibrations of the end mill 10 during operation.

Referring now to FIGS. 2 and 3, the tunable vibration absorber 40 comprises an absorber mass 42 and a resilient material 44 disposed between each absorber mass 42 and the outer wall 34d is disposed within the interior cavity 34.

Advantageously, the absorber mass 42 and the resilient material 44 follows the twisted helical path of the internal cavity 34. This can be accomplished for forming the tunable vibration absorber 40 using an additive manufacturing (i.e., 3D printing) process, similar to the internal cavity 34. In the illustrated embodiment, the resilient material 44 has a thickness, T, that is constant along the length, L3, of the tuned vibration absorber 40. In one embodiment, the thickness, T, is about 1 mm for an end mill 10 having a cutting diameter, D, of about 12 mm.

The material for the absorber mass 42 is selected for its mechanical properties, such as stiffness, density and the like. In one embodiment, the absorber mass 42 are made of the same material as the cutting portion 14. For example, the absorber mass 42 can be made of tool steel, carbide, and the like. In another embodiment, the absorber mass 42 can be made of a different material than the cutting portion 14. Typically, the absorber mass 42 is made of a material that has a density equal to or greater than the shank portion 14. For example, the absorber mass 42 can be made of lead, heavy metal, bronze, and the like, and the shank portion 14 can be made of tool steel, carbide, and the like.

Similar to the absorber masses 42, the resilient material 44 is selected for its mechanical properties, such as stiffness, viscous damping, density, and the like. In one embodiment, the resilient material 44 is made of a polymer with viscoelasticity (i.e., both viscosity and elasticity) with a generally low Young's modulus and high failure strain, as compared to other materials. In one embodiment, the resilient material 44 can be made of a commercially available fluoropolymer elastomer sold under the tradename VITON®, which is a registered trademark of The Chemours Company having headquarters in Wilmington, Delaware.

The tunable vibration absorber 40 can be tuned to a desired frequency by selecting the length, L3, of the tunable vibration absorber 40, and the mechanical properties of the absorber mass 42 and the resilient material 44. Specifically, the mechanical properties of the absorber mass 42 can be selected such that the desired frequency of the tunable vibration absorber 40 is approximately equal to the natural frequency of the end mill 10, but without the tunable vibration absorber 40. In addition, the mechanical properties of the tunable vibration absorber 40 can be selected such that the frequency of the resilient material 44 causes destructive interference between the frequency of the tunable vibration absorber 40 and the natural frequency of the end mill 10, but without the tunable vibration absorber 40.

Figure 5:
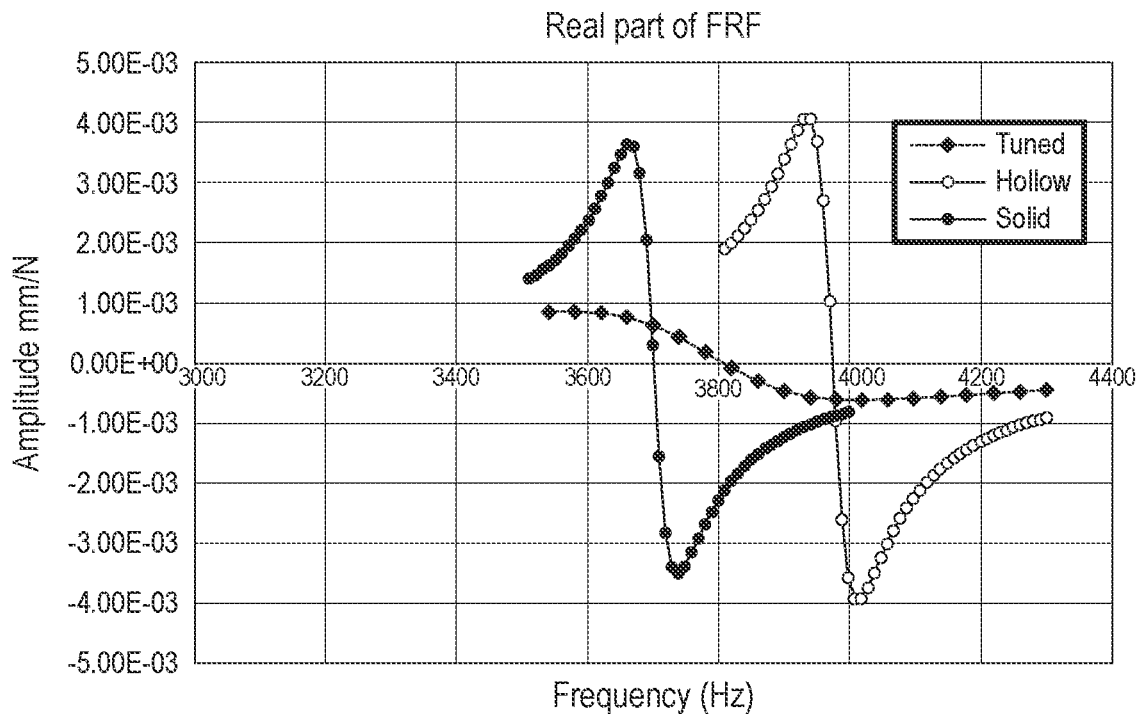
FIG. 5 is a graphical representation of a simulated frequency response function illustrating the amplitude as a function of frequency for an end mill having the tunable vibration absorber of the disclosure, the same end mill with an internal cavity and without the tunable vibration absorber, and the same end mill without the internal cavity and the tunable vibration absorber (i.e., solid end mill)

FIG. 5 is a graphical representation of a simulated frequency response function of three different end mill configurations: 1) the end mill 10 with the tunable vibration absorber 40 of the disclosure; 2) the same end mill as 1), but without the tunable vibration absorber 40 of the disclosure; and 3) the same end mill as 1), but without the interior cavity 34 and the tunable vibration absorber 40 (i.e., a solid end mill). In the simulation, the end mill had a cutting diameter, D, of about 12 mm, a total length, L, of about 75 mm, and the length, L3, of tunable vibration absorber 40 is about 15.4 mm (0.606 inches). As shown in FIG. 5, the tunable vibration absorber 40 of the disclosure reduced the amplitude of the frequency response function (FRP) by about a factor of 4, as compared to the end mill with only the interior cavity 34 and the solid end mill. Thus, the results indicate that the tunable vibration absorber 40 of the disclosure significantly suppresses or eliminates vibration of the end mill 10.

Figure 6:
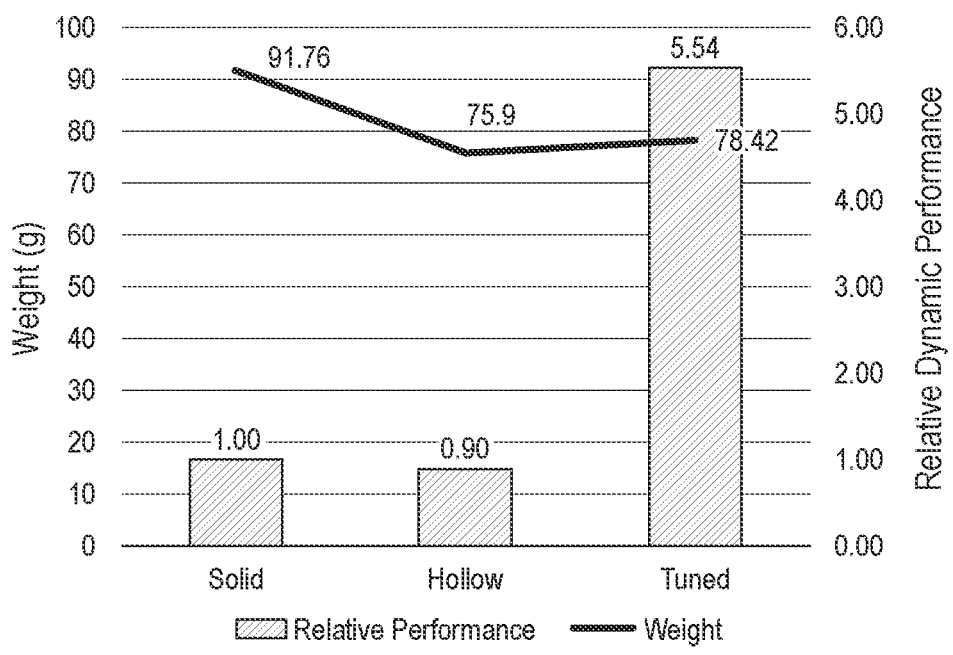
FIG. 6 is a graphical representation of a simulated frequency response function illustrating the relative dynamic performance and overall weight for an end mill having the tunable vibration absorber of the disclosure, the same end mill with an internal cavity and without the tunable vibration absorber, and the same end mill without the internal cavity and the tunable vibration absorber (i.e., solid end mill)

FIG. 6 is a graphical representation of a comparison of the relative dynamic performance and overall weight for the three different end mill configurations mentioned above. As shown in FIG. 6, the solid end mill configuration had the greatest overall weight, while the other two end mill configurations (i.e., with the internal cavity) had a relatively lower overall weight. However, the end mill configuration with the tunable vibration absorber 40 of the disclosure demonstrated an increase in the relative dynamic performance by at least a factor of 5 over the two other end mill configurations. Thus, the results indicate that the tunable vibration absorber 40 of the disclosure significantly improves the relative dynamic performance of the end mill 10.

Ideally, the absorber mass 42 should be located as close as possible to the cutting end 16 of the end mill 10 because the amplitude of vibration is maximum at the cutting end 16. However, it is noted that the tunable vibration absorber 40 does not extend entirely to the end wall 34c of the interior cavity 34, thereby resulting in the gap, G, between the end wall 34c of the internal cavity 34 and the tunable vibration absorber 40. The gap, G, enables expansion of the tunable vibration absorber 40 in the longitudinal direction (i.e., along the central, longitudinal axis, $C_L$. In one embodiment, the gap, G, may be filled with the resilient material 44, but still allow expansion of the tunable vibration absorber 40 in the longitudinal direction. In this embodiment, the resilient material 44 in the gap, G, is squeezed when fluid pressure is applied to a distal end 17 of the tunable vibration absorber 40.

The tunable vibration absorber 40 described above comprises a substantially solid construction, which causes the tunable vibration absorber 40 to be squeezed in the longitudinal direction (i.e., parallel to the z-axis) when fluid pressure is applied to the distal end 17 of the tunable vibration absorber 40. However, it will be appreciated that the disclosure is not limited by the tunable vibration absorber 40 having a substantially solid construction, and that the invention can be practiced with non-solid constructions.

Figure 7:
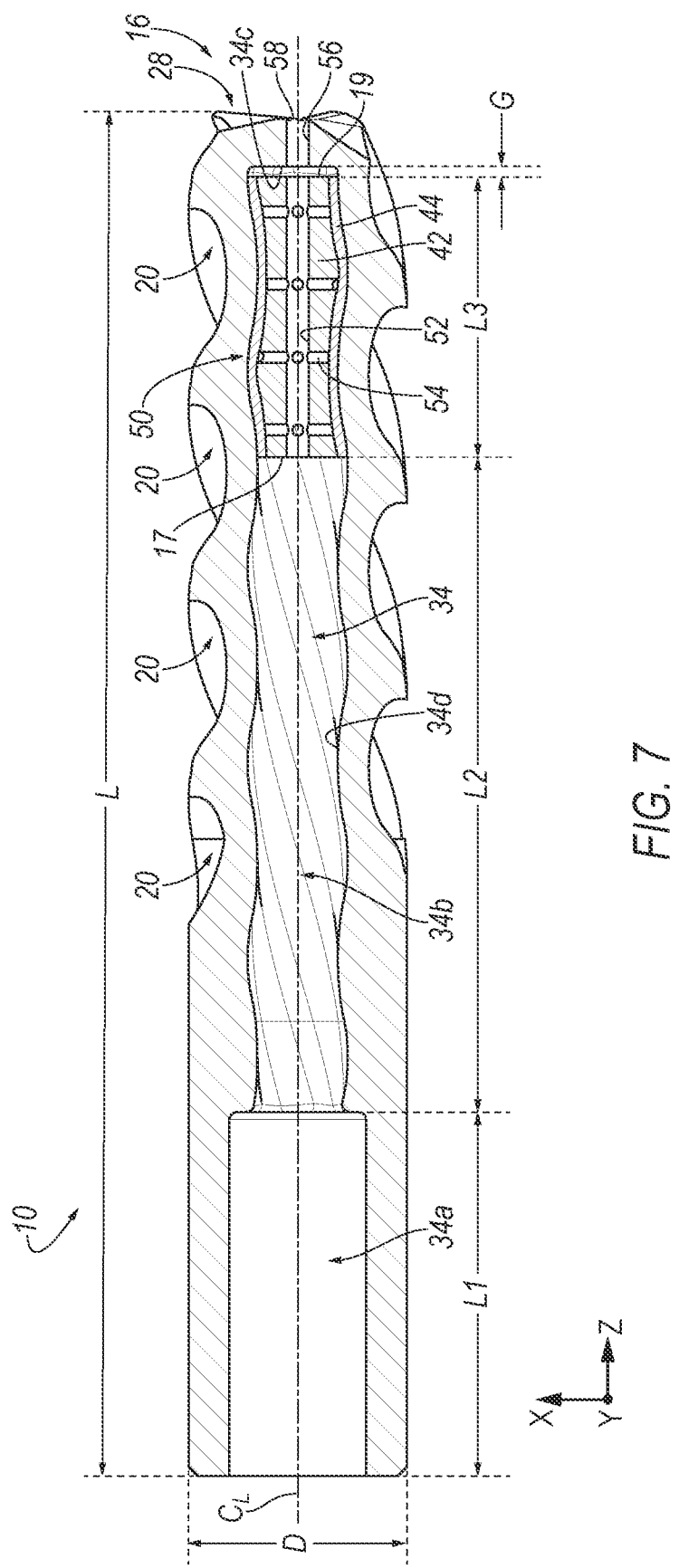
FIG. 7 is a cross-sectional view of the rotary cutting tool taken along line A-A of FIG. 1 showing an internal tunable vibration absorber with an internal fluid cavity according to another aspect of the disclosure.
Figure 8:
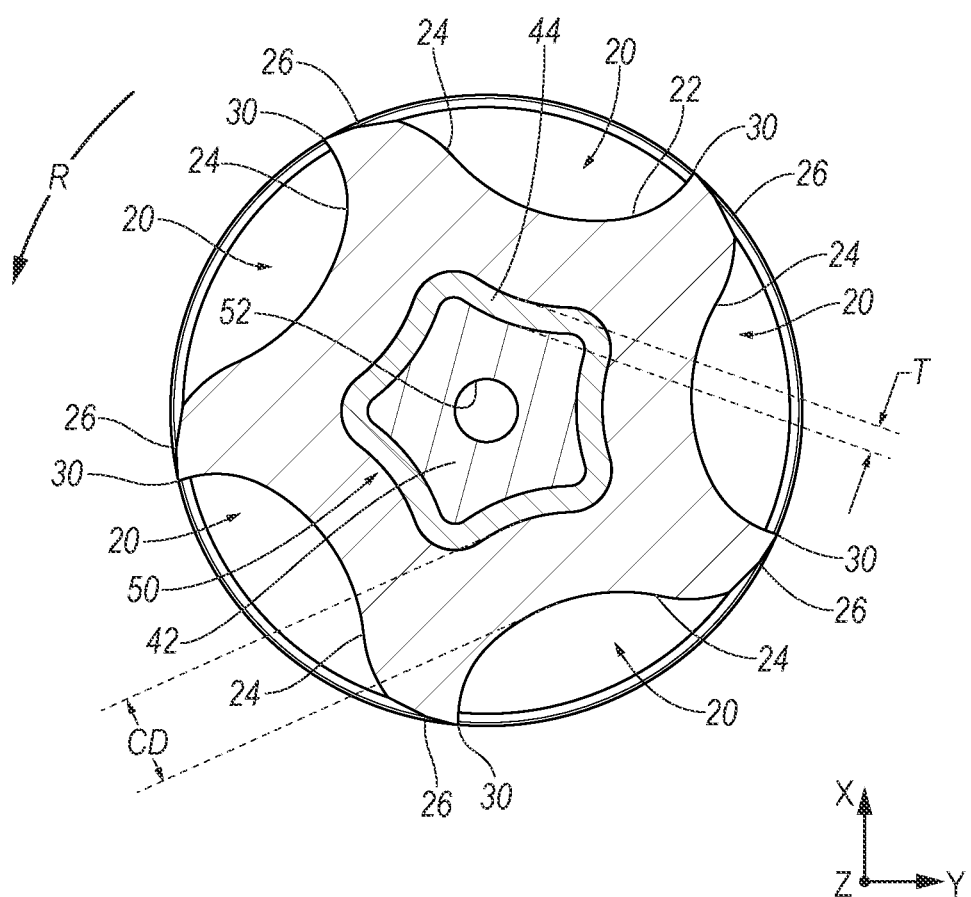
FIG. 8 is a cross-sectional view of the rotary cutting tool taken along line B-B of FIG. 1 showing the internal tunable vibration absorber with the internal fluid cavity.

Referring now to FIGS. 7 and 8, a tunable vibration absorber 50 having a non-solid construction is shown according to another aspect of the invention. In this aspect, the tunable vibration absorber 50 is substantially identical to the tunable vibration absorber 40, except that the tunable vibration absorber 50 includes a main internal fluid cavity 52 and a plurality of secondary internal fluid cavities 54 extending radially outward from the main internal fluid cavity 52 to the resilient material 44. In addition, the main internal fluid cavity 52 extends longitudinally from one distal end 17 to the opposite distal end 19 of the tunable vibration absorber 50 and is in fluid communication with an optional fluid exit bore 56 having an outlet port 58 formed in the cutting end 16 of the end mill 10. The fluid exit bore 56 provides fluid to the tool/workpiece interface at the cutting end 16 of the end mill 10, thereby enhancing chip evacuation during a cutting operation.

In the illustrated embodiment, the main internal fluid cavity 52 has a larger cross-sectional area than each of the plurality of secondary fluid cavities 54. For example, the cross-sectional area of the main internal fluid cavity 52 can be at least twice in magnitude than the cross-sectional area of each secondary fluid cavity 54. However, it will be appreciated that the disclosure is not limited by the relative cross-sectional areas of the main internal fluid cavity 52 and the secondary internal fluid cavities 54, and that the disclosure can be practiced with any desirable relative cross-sectional areas between the cavities 52, 54, depending on the desired fluid flow throughout the tunable vibration absorber 50.

In the illustrated embodiment, the main internal fluid cavity 52 extends entirely through the absorber mass 42 along the central, longitudinal axis, $C_L$, of the end mill 10. In other words, the main internal fluid cavity 52 extends in a longitudinal direction (i.e., along the z-axis) and is substantially parallel with respect to the central, longitudinal axis, $C_L$, of the end mill 10. In addition, the secondary fluid cavities 54 are substantially perpendicular with respect to the central, longitudinal axis, $C_L$, of the end mill 10 (i.e., substantially perpendicular to the z-axis). Thus, the main internal fluid cavity 52 is substantially perpendicular to the secondary internal fluid cavities 54. However, it will be appreciated that the disclosure is not limited by the main internal fluid cavity 52 being substantially parallel with respect to the central, longitudinal axis, $C_L$, and the secondary internal fluid cavity 54 being substantially perpendicular with respect to the central, longitudinal axis, $C_L$, and that the disclosure can be practiced with the main internal fluid cavity 52 and the secondary internal fluid cavity 54 having any desired angle with respect to the central, longitudinal axis, $C_L$.

It may be necessary to tune the tunable vibration absorber 50 for a particular type of tool holder (not shown) and/or for a particular total length, L, of the end mill 10. The purpose of the main internal fluid cavity 52 and the plurality of secondary internal fluid cavities 54 is to provide "smart tuning" capability to the tunable vibration absorber 50. This is achieved by controlling the pressure of the fluid within the tunable vibration absorber 50, which in turn, compresses the resilient material 44 a desired amount, thereby causing the tunable vibration absorber 50 to produce a desired frequency. Typically, an increase in the pressure of the fluid produces an increase in the frequency of the tunable vibration absorber 50. For example, the pressure of the fluid can be in the range between about 50 bar to about 70 bar. The pressure of the fluid can be controlled, for example, by a computer numerical control (CNC), and the like, to cause the tunable vibration absorber 50 to produce the desired frequency.

As described above, the internal cavity 34 (and tunable vibration absorbers 40, 50) maintains a constant distance, CD, between the bottom 20a of each flute 20 and the side walls 34d of the internal cavity 34. As a result, the tunable vibration absorbers 40, 50 maintain the constant distance, CD, between the bottom 20a of each flute 20. However, it will be appreciated that the principles of the disclosure can be practiced with a tunable vibration absorber 60 that does not maintain the constant distance, CD, between the bottom 20a of each flute 20

Figure 9:
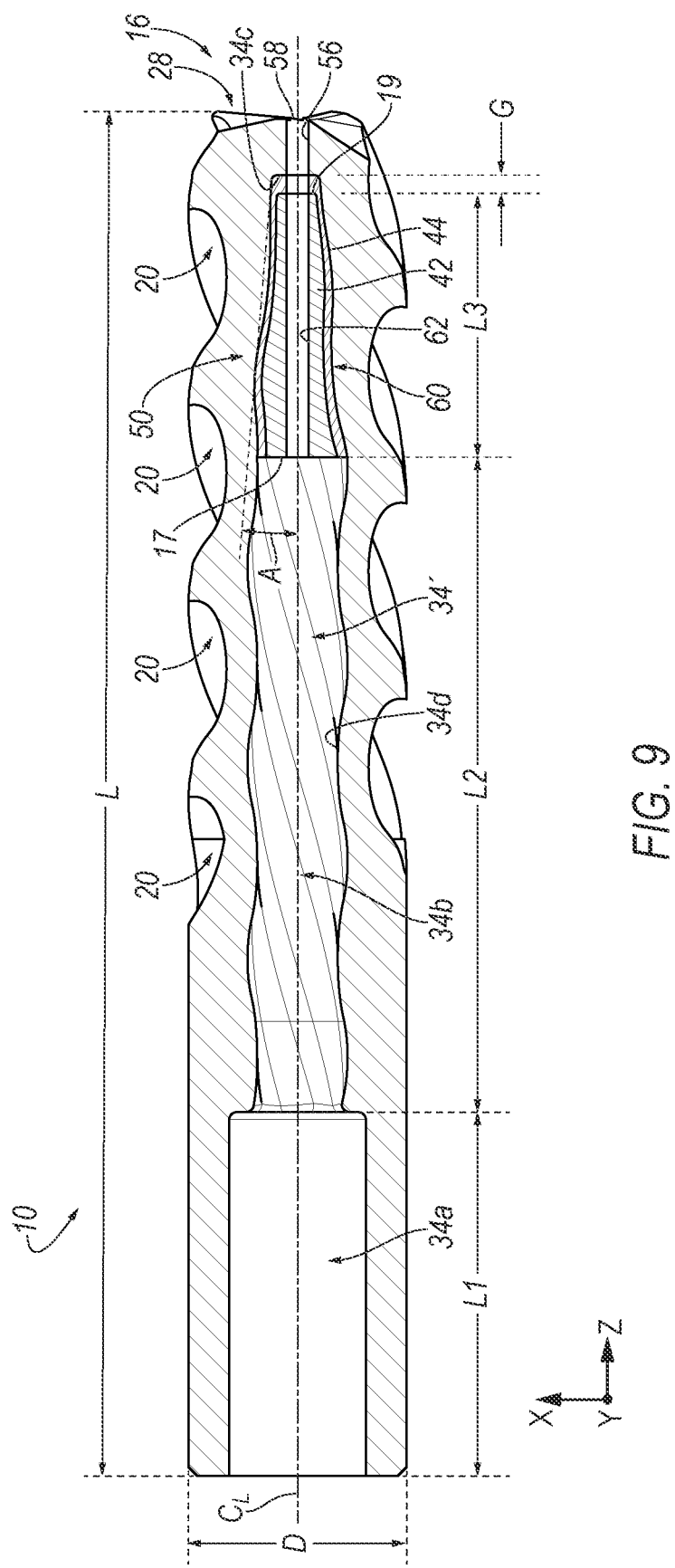
FIG. 9 is a cross-sectional view of the rotary cutting tool taken along line A-A of FIG. 1 showing an internal tunable vibration absorber with an internal fluid cavity according to another aspect of the disclosure.

Referring now to FIG. 9, in one aspect of the disclosure, a tunable vibration absorber 60 is substantially identical to the tunable vibration absorber 50, except that the outer surface of the tunable vibration absorber 60 is tapered and the tunable vibration absorber 60 does not include the radially extending secondary internal fluid cavities 54, but only a main internal fluid cavity 62. Specifically, the tunable vibration absorber 60 is disposed within a portion of the internal cavity 34 in which the outer wall 34b is formed with a taper angle, A, of between about 5 degrees and about 45 degrees with respect to the central, longitudinal axis, $C_L$, of the end mill 10. As a result, the absorber mass 42 and the resilient material 44 of the tunable vibration absorber 60 is similarly tapered such that the cross-sectional area of the tunable vibration absorber 60 is smallest at the distal end 19 proximate the cutting end 16 and largest at the other distal end 17 of the of the tunable vibration absorber 60. In other words, the distance, CD, varies in such a way that a cross-sectional area of the tunable vibration absorber 60 is smallest at the distal end 19 proximate the cutting end 16 of the rotary cutting tool and largest at the opposite distal end 17 of the tunable vibration absorber 60. Similar to the tunable vibration absorber 50, the tapered tunable vibration absorber 60 can be tuned to a desired frequency by controlling the pressure of the fluid flowing within the main internal fluid cavity 62 of the tunable vibration absorber 60.

In summary, the rotary cutting tool 10, such as an end mill, that includes the tunable vibration absorber 40, produced the unexpected results of significantly reducing tangential, axial and radial vibration of the end mill 10, as compared to the same end mill with the internal cavity 34, but without the tunable vibration absorber 40, and the same end mill, but without the internal cavity 34 and the tunable vibration absorber 40 (i.e., solid end mill).

The patents and publications referred to herein are hereby incorporated by reference.

Having described presently preferred embodiments the invention may be otherwise embodied within the scope of the appended claims.

What is claimed is:

1. A rotary cutting tool, comprising:
a shank portion;
a cutting portion adjoining the shank portion and having a cutting end, the cutting portion having a plurality of blades separated by helically twisted flutes, each blade including a leading face, a trailing face, and a land surface extending between the leading face and the trailing face; and
a tunable vibration absorber disposed within an internal cavity formed in the cutting portion, the internal cavity having a helical shape that corresponds with the shape of the helically twisted flutes, the tunable vibration absorber has a corresponding helical shape to the internal cavity helical shape, the tunable vibration absorber comprising an absorber mass and a resilient material disposed between the absorber mass and a wall of the internal cavity,
wherein the internal cavity has a first diameter section disposed within the shank portion and having a length, L1, and a second diameter section adjoining the first diameter section for receiving the tunable vibration absorber, the first diameter section having a first diameter and the second diameter section having a second diameter smaller in magnitude than the first diameter, the second diameter section having a total length equal to L2+L3+G, where L3 is a length of the tunable vibration absorber, L2 is a length of the internal cavity without the tunable vibration absorber located between the first diameter section and the tunable vibration absorber, and G is a length of a gap between the tunable vibration absorber and an end wall of the internal cavity,
wherein L2 is greater than L3,
wherein the lengths L1, L2, L3 and G are measured in a direction parallel to a central, longitudinal axis, $C_L$, of the rotary cutting tool,
wherein the helical shape of the internal cavity extends over a length, measured in the direction parallel to the central, longitudinal axis, $C_L$, of the rotary cutting tool, greater than the length L3,
wherein the tunable vibration absorber is tuned to a desired frequency by selecting mechanical properties of the absorber mass and the resilient material, and
wherein the desired frequency of the tunable vibration absorber causes destructive interference between the tunable vibration absorber and the rotary cutting tool, thereby suppressing vibration of the rotary cutting tool during a cutting operation.

2. The rotary cutting tool of claim 1, wherein the internal cavity corresponds with the shape of the helically twisted flutes in such a way that a distance, CD, between a bottom of at least one of the plurality of flutes and the wall of the internal cavity is substantially constant along the length, L3, of the tunable vibration absorber.

3. The rotary cutting tool of claim 1, wherein the resilient material has a thickness that is constant along the length, L3, of the tuned vibration absorber.

4. The rotary cutting tool of claim 1, wherein the tunable dynamic absorber comprises a main internal fluid cavity.

5. The rotary cutting tool of claim 4, wherein the main internal fluid cavity is coaxial with respect to the central, longitudinal axis, $C_L$, of the rotary cutting tool.

6. The rotary cutting tool of claim 4, wherein the tunable dynamic absorber further comprises a plurality of secondary internal fluid cavities extending radially outward from the main internal fluid cavity to the resilient material.

7. The rotary cutting tool of claim 6, wherein each of the plurality of secondary internal fluid cavities are substantially perpendicular to a central, longitudinal axis, $C_L$, of the rotary cutting tool.

8. The rotary cutting tool of claim 6, wherein the main internal fluid cavity has a larger cross-sectional area than each of the plurality of secondary fluid cavities.

9. The rotary cutting tool of claim 1, wherein the tunable vibration absorber is formed by additive manufacturing.

10. The rotary cutting tool of claim 1, wherein the rotary cutting tool is an end mill.

11. A rotary cutting tool, comprising:
a shank portion;
a cutting portion adjoining the shank portion and having a cutting end, the cutting portion having a plurality of blades separated by helically twisted flutes; and
a tunable vibration absorber disposed within an internal cavity formed in the cutting portion, the internal cavity having a helical shape that corresponds with the shape of the helically twisted flutes, the tunable vibration absorber has a corresponding helical shape to the internal cavity helical shape, the tunable vibration absorber comprising an absorber mass and a resilient material disposed between the absorber mass and a wall of the internal cavity, the tunable dynamic absorber includes a main internal fluid cavity coaxial with respect to a central, longitudinal axis, $C_L$, of the rotary cutting tool,
wherein the internal cavity has a first diameter section disposed within the shank portion and having a length, L1, and a second diameter section adjoining the first diameter section for receiving the tunable vibration absorber, the first diameter section having a first diameter and the second diameter section having a second diameter smaller in magnitude than the first diameter, the second diameter section having a total length equal to L2+L3+G, where L3 is a length of the tunable vibration absorber, L2 is a length of the internal cavity without the tunable vibration absorber located between the first diameter section and the tunable vibration absorber, and G is a length of a gap between the tun-able vibration absorber and an end wall of the internal cavity,
wherein L2 is greater than L3,
wherein the lengths L1, L2, L3 and G are measured in a direction parallel to the central, longitudinal axis, $C_L$, of the rotary cutting tool,
wherein the helical shape of the internal cavity extends over a length, measured in the direction parallel to the central, longitudinal axis, $C_L$, of the rotary cutting tool, greater than the length L3, and
wherein the tunable vibration absorber is tuned by controlling a fluid pressure within the main internal cavity.

12. The rotary cutting tool of claim 11, wherein the tunable vibration absorber further comprises a plurality of secondary internal fluid cavities extending radially outward from the main internal fluid cavity to the resilient material.

13. The rotary cutting tool of claim 11, wherein mechanical properties of the absorber mass and the resilient material are selected in such a way as to the enable the tunable vibration absorber to be tuned to a desired frequency, and
wherein the desired frequency of the tunable vibration absorber causes destructive in-terference between the tunable vibration absorber and the rotary cutting tool, thereby sup-pressing vibration of the rotary cutting tool during a cutting operation.

14. The rotary cutting tool of claim 11, wherein the main internal fluid cavity is in fluid communication with a fluid exit bore to provide fluid to a tool/workpiece interface at the cutting end of the rotary cutting tool.

15. The rotary cutting tool of claim 11, wherein the cutting portion comprises a plurality of blades separated by helically twisted flutes, each blade including a leading face, a trailing face, and a land surface extending between the leading face and the trailing face.

* * * * *